United States Patent [19]
Stephan et al.

[11] 3,806,865
[45] Apr. 23, 1974

[54] DIRECT GYRO-DRIVEN INSTRUMENT ASSEMBLY
[75] Inventors: Ingo L. Stephan, Beverly, N.J.;
Robert H. Brady, Houston, Tex.
[73] Assignee: Narco Scientific Industries, Inc.,
Fort Washington, Pa.
[22] Filed: Nov. 12, 1971
[21] Appl. No.: 198,337

[52] U.S. Cl............................. 340/27 NA, 33/318
[51] Int. Cl.............................................. G08g 5/00
[58] Field of Search......... 340/27 R, 27 AT, 27 NA;
33/317, 318, 349, 351, 352, 317 R, 317 D

[56] References Cited
UNITED STATES PATENTS
3,648,230  3/1972  Younkin ...................... 340/27 NA Primary Examiner—Kathleen H. Claffy
Assistant Examiner—Randall P. Myers
Attorney, Agent, or Firm—Paul & Paul

[57] ABSTRACT

A direct gyro-driven instrument assembly for use in an aircraft, providing in a combined display a compass dial, a course heading selector needle, Left-Right indicator, and To-From indicator. The entire instrument assembly of the apparatus is direct driven by a non-slaved gyro and is supported at the front end by ball bearings mounted on a front transparent cover. A double fulcrum caging mechanism, operable from either a compass adjust knob or a course selector adjust knob, provides for caging of the gyro when either adjustment is being made. The caging mechanism, in combination with a compass card-course selector clutch provides means for holding the compass card in fixed position while the course heading selector indicator is being adjusted, and without the use of a differential.

12 Claims, 8 Drawing Figures

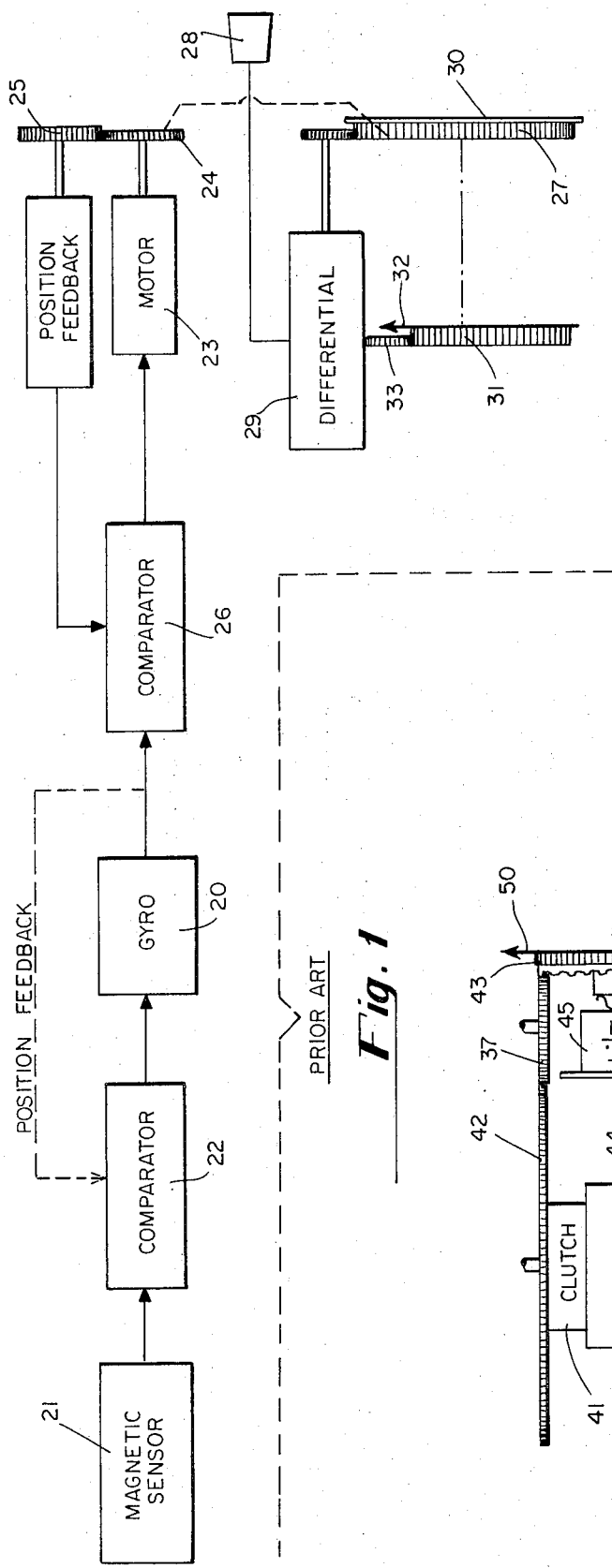
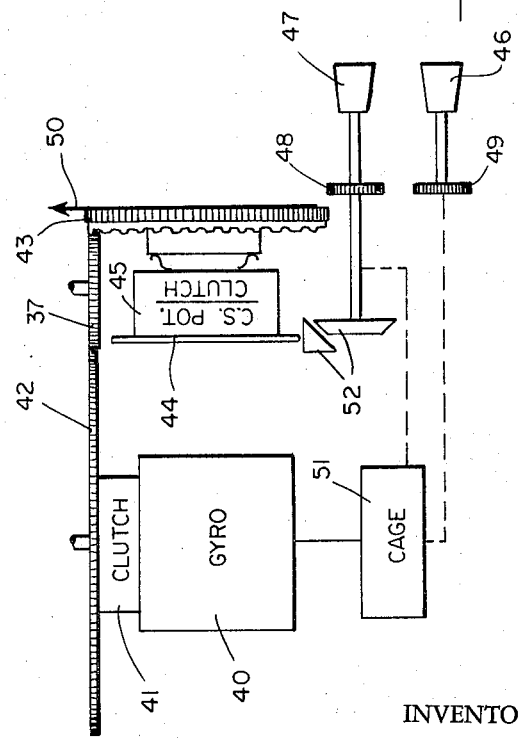

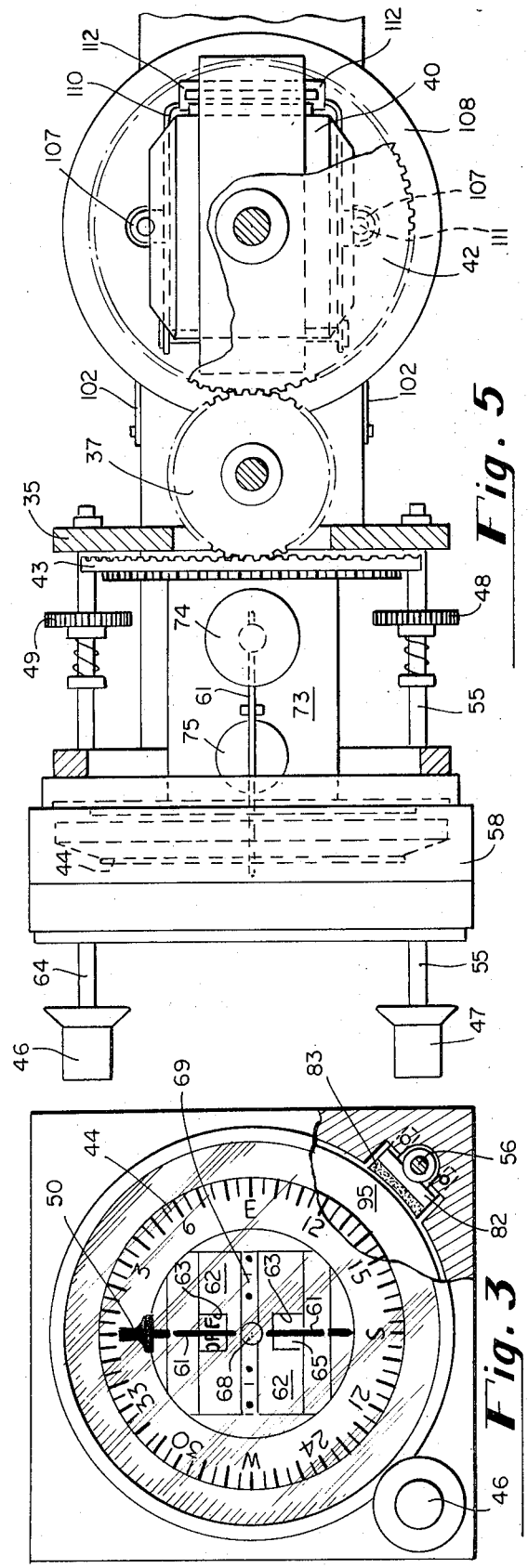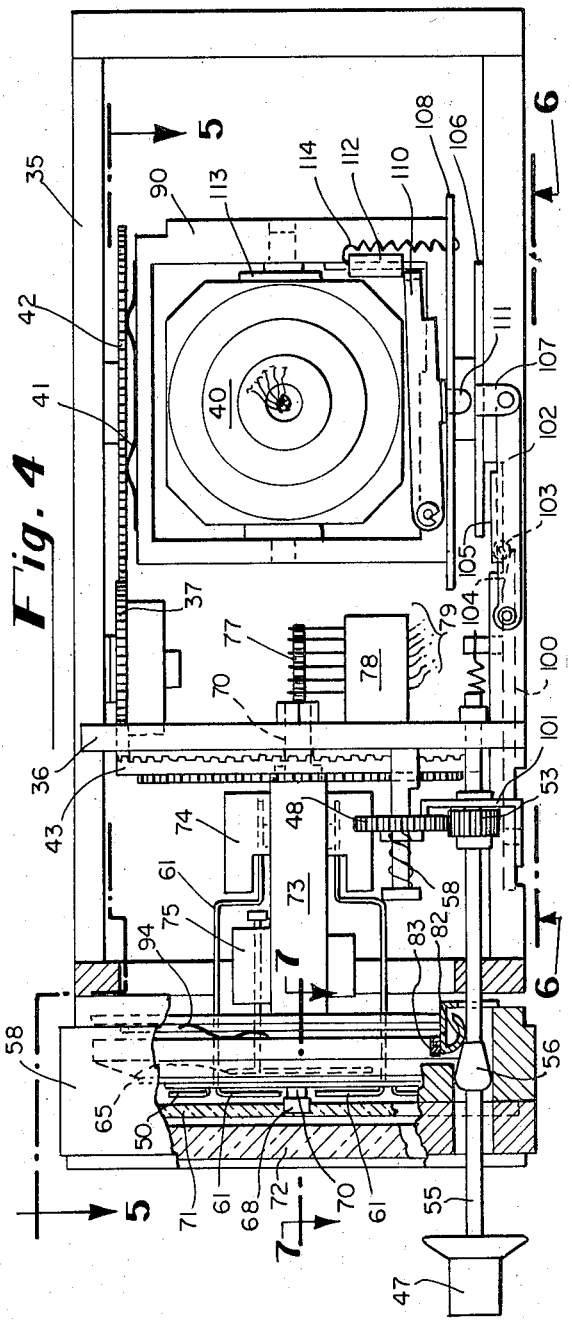

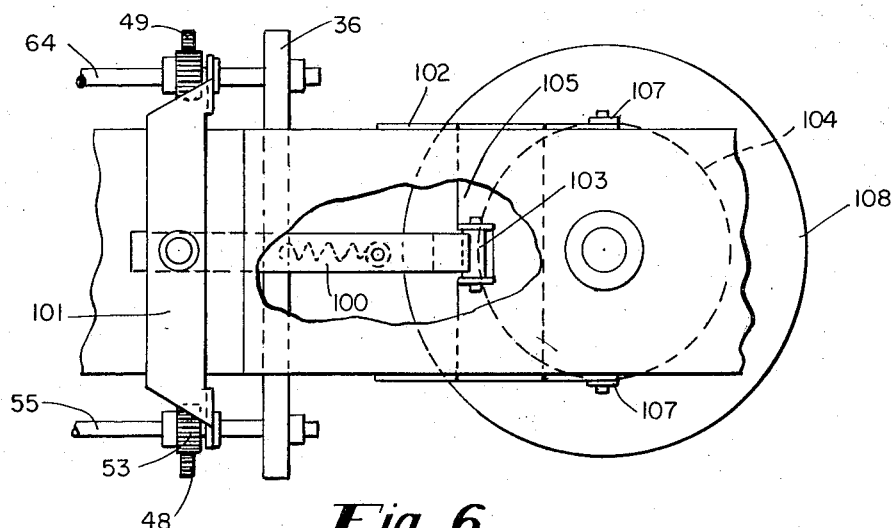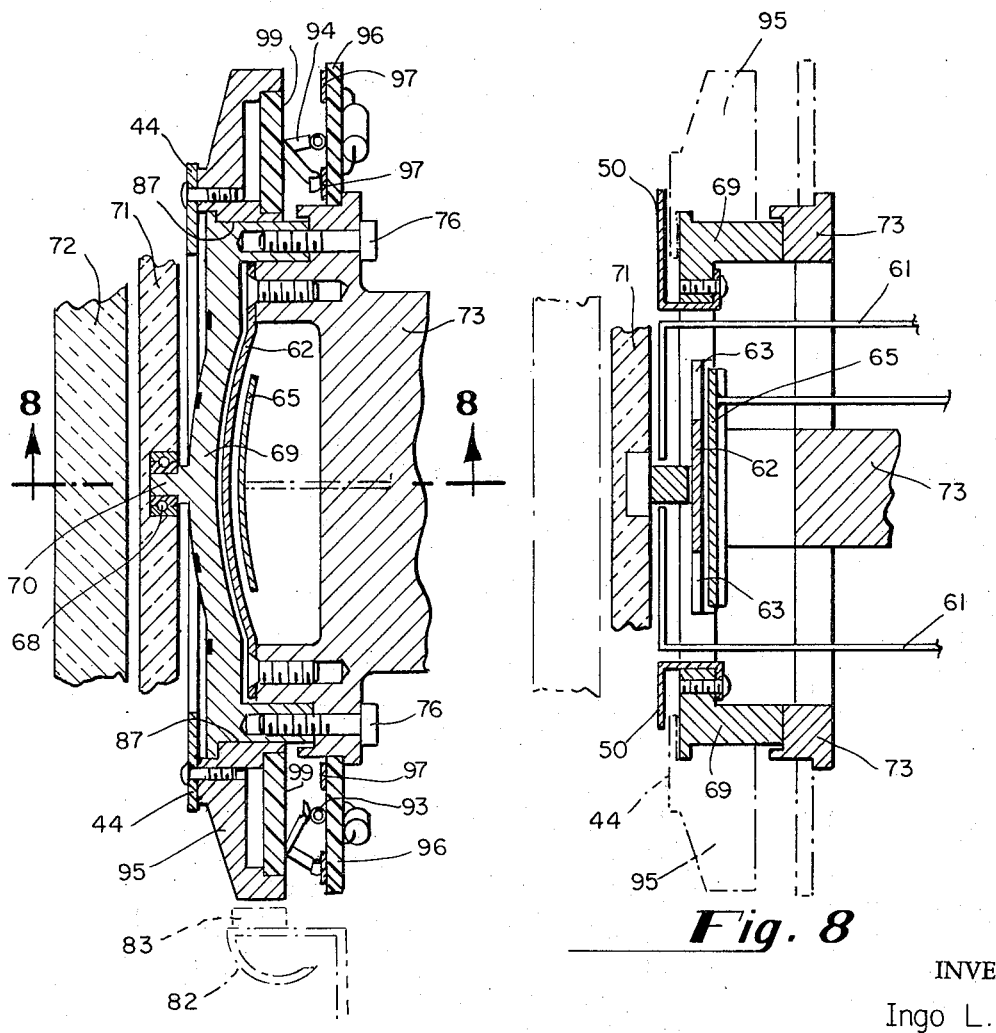

DIRECT GYRO-DRIVEN INSTRUMENT ASSEMBLY

BACKGROUND OF THE INVENTION

1. Field of the Invention

This invention lies in the field of gyro-driven indicator assemblies for use in aircraft and, more particularly, direct gyro-driven instrument assemblies with means for clutch coupling and decoupling of the compass card to the main instrument assembly, to enable fixing the compass in position while adjusting the course heading selector indicator.

2. Description of the Prior Art

Gyro-driven navigation indicators are widely available for use in present day aircraft. A preferred form of such presently utilized indicators presents on one instrument display, or face, the compass, the course selector indicator, a Left-Right indicator, and a To-From indicator. Such instruments are sometimes referred to as horizontal situation gyro indicators, or directional gyro omni indicators. By whatever name, the presently used instruments are broken up into two parts, a remote slaved gyro unit with a synchrotransmitter, and the display, or front end unit which is motor driven from signals coupled thereto from the gyro. As is well known by users of such equipment, the expense of this two part system is considerable, making it economically inaccessible to many users. Another reason for the expense involved is derived from the fact that the course heading selector arrow, or OBS arrow, is positioned by the output of a differential, having inputs from both the gyro drive and the OBS selector knob. The differential inherently contributes drag, and of course, contributes extra expense.

One of the primary reasons for having separate gyro and indicator units, with the instrument assembly being motor driven under control from the gyro, is the fact that a relatively large amount of instrumentation apparatus must be driven from the gyro. Prior art instrument assemblies contribute such a great amount of drag and inertial load to the system that direct drive from the gyro without the use of an intermediate motor is not possible. Accordingly, there is a widespread need in the industry today for an instrument package comprising just one unit, containing the gyro and all of the instrumentation, which is direct driven so as to eliminate the bulk and the expense of the motor, and which can be operated by the pilot without the need for a differential. The invention as disclosed herein and claimed meets these needs, and overcomes the difficulties of the prior art in providing an inexpensive and efficient mechanism for directly driving the assembly from the gyro and providing for all the manipulative operations found in prior art systems without the need of incorporating a differential into the package. The instrument assembly of this invention has been reduced to practice, and provides a highly efficient and easily operable device at a cost which is considerably less than functionally equivalent prior art systems.

SUMMARY OF THE INVENTION

It is a primary object of this invention to provide a direct gyro-driven instrument assembly for use in aircraft, which eliminates the need for an instrument assembly drive motor, and provides means for setting the compass and the course selector indicator without the use of a differential.

It is a further object of this invention to provide a direct gyro-driven instrument assembly which is housed in one relatively compact unit, presents a single integrated panel display of compass and horizontal bearing information, is simple and efficient to operate and inexpensive compared to prior art systems.

It is another object of this invention to provide an integrated instrument assembly displaying bearing and horizontal position information, which is mounted so that the entire assembly might be direct driven by an unslaved gyro which is housed with the instrument assembly in a single unit. Of course, a slaved gyro could also drive the assembly.

It is another object of this invention to provide a direct gyro-driven instrument for use foruse in aircraft which is inexpensive and compact compared to present and prior art systems, and which provides an omni, of course headings election knob and a compass, or bearing adjustment knob, which are operated in a conventional manner, and wherein the compass display is clutch-coupled to the rest of the instrument assembly, and wherein operator movement of the course selector indicator relative to the compass is achieved without the need of a differential.

In accordance with the above stated objectives, this invention provides a gyro and instrument assembly mounted within a single housing, an instrument face for integrated presentation of the compass card, course heading selector indicator, To-From indicator, and Left-Right indicator, the instrument assembly being mounted on supports forward of and rearward of the instrument face and direct-driven by the gyro through suitable gearing. The compass card is clutch coupled to the instrument assembly such that it is normally carried therewith, but may be held fixed in position for movement of the remaining parts of the instrument face relative thereto. A compass setting knob and course selector knob are pivotably interconnected to a gyro caging mechanism, and the course selector knob is operatively connected to the compass-instrument assembly clutch. In operation, the gyro is caged when either the compass on course selector indicator is adjusted, and the compass is locked in position during course selector adjustment.

BRIEF DESCRIPTION OF THE DRAWINGS

FIG. 1 is a diagrammatic representation of a prior art gyro-driven indicator system.

FIG. 2 is a diagrammatic representation of the direct gyro-driven instrument assembly of this invention.

FIG. 3 is a face view of the indicator of this invention, with a section broken away.

FIG. 4 is a right side elevation view of the instrument assembly of this invention with the front, or face end broken away.

FIG. 5 is a sectional top view of the instrument assembly of this invention taken along lines 5—5 of FIG. 4.

FIG. 6 is a fragmentary bottom view taken along lines 6—6 of FIG. 4.

FIG. 7 is a fragmentary sectional view taken along lines 7—7 of FIG. 4.

FIG. 8 is a fragmentary sectional view taken along lines 8—8 of FIG. 7.

FURTHER DESCRIPTION OF THE PRIOR ART

In FIG. 1, a diagrammatic view is presented showing a typical prior art instrument with gyro-driven compass and course selector needle. The gyro 20 is slaved to magnetic sensor 21, with the position of gyro 20 being communicated through a feedback path to a comparator 22 so as to produce an output signal which maintains the gyro 20 at a position corresponding to the signal from sensor 21. A signal representing the position of gyro 20 as communicated through comparator 26 to motor 23 which drives output gear 24. Gear 24 in turn is linked to and drives compass gear 27. The motor output position is communicated through feedback gear 25 to comparator 26, which produces an output signal which adjusts the position of motor 23 according to the signal from gyro 20. As is known in the art, as long as the comparator senses a difference in the inputs, it will produce an output tending to drive the motor in a direction so as to cause the compared signals to become equal. All of this encompasses a conventional feedback system for controlling the compass gear 27 and through it compass face 30 which is attached thereto.

In this prior art system, when the operator desires to set the course selector needle, shown diagrammatically at 32, knob 28 is operated, the mechanical movement of the knob being communicated to a standard differential unit 29. The position of compass gear 27 is also communicated to differential 29 through suitable gearing, such that the differential has two inputs, and produces an output which is accordingly a function of the position of both compass gear 27 and knob 28. The differential output is communicated through differential output gear 33 to needle gear 31, which in turn supports needle 32. By this conventional use of a diffenential, the needle 32 may be positioned without affecting the free movement of compass 30. However, this is done at the cost of requiring a differential unit.

It is also to be noted that in this prior art system the gyro not only must drive the compass, but also must drive a substantial instrument assembly (not shown in FIG. 1). For this reason, the separate motor 23 is necessitated. It is necessary to move the mass of the meters, as well as the compass and all of the standard indicator apparatus normally in use. It is not generally considered feasible to direct drive all of this apparatus with the gyro and, indeed, the use of a motor is standard equipment in such aircraft systems. Thus, the conventional prior art gyro driven system requires both a motor and a differential, adding considerable expense and bulk to the entire apparatus package.

DESCRIPTION OF THE PREFERRED EMBODIMENT

The indicator apparatus of this invention forms a component part of an aircraft navigation system, the overall operation of which is familiar to users of aircraft navigation equipment. Course information signals are obtained from VORTAC stations, and are processed thorugh a suitable receiver to attain signals of a desired strength. These signals, processed along with a signal representing the position of the OBS needle (as set by the pilot) are processed to obtain driving signals from the Left-Right and To-From indicators. The manner of processing such signals is well known in the art, and while it is an important part of the environment of this invention, it is not part of the invention as claimed. As used herein, the course selector indicator is also referred to as the omni indicator, or OBS needle. The direction of the aircraft, as displayed by the compass, may be referred to either as position, horizontal position, or bearing.

FIG. 2 is a diagrammatic representation of the apparatus of this invention suitable for use in an aircraft. It is to be noted that the representation is merely to illustrate the component parts of the apparatus, and is not a representation of their actual spatial relationship in the apparatus as fully assembled. Gyro 40, a standard electric driven gyro, is normally connected through clutch 41 to drive gear 42, which in turn is connected through connecting gear 37 to main instrument drive gear 43. The pointer, or course selector needle, is integrally connected to the main instrument drive gear, which gear is also normally connected through course selector clutch 45 to rotatable compass dial 44. Thus, under normal conditions, the gyro movement (which indicates change of aircraft direction) causes the compass dial and the pointer to move together. When the operator desires to adjust solely the compass dial, compass knob 46 is operated. Gear 49, shown connected to knob 46, is connected to main instrument drive gear 43, such that both compass dial and pointer are moved, while at the same time gyro cage 51 is operated to hold gyro 40 in position. Clutch 41 permits movement of gear 43 while the gyro is caged. In this manner, the compass is set independently of the gyro. When the operator desires to set the course selector pointer (variably referred to as the omni bearing selector, or OBS indicator), knob 47 is operated. Operation of knob 47 causes gear 48 to connect to the main instrument drive gear 43 and causes clutch linkage 52 to release clutch 45, such that the compass dial is not connected to the main instrument drive gear. In this manner, movement of the pointer is not translated into movement of the compass dial. At the same time, cage apparatus 51 is operated to hold the gyro in position, clutch 41 permitting movement of the drive gear while the gyro is caged. Thus, upon operation of knob 47 the pointer may be moved, but both the gyro and the compass dial are maintained stationary. In this manner, course settings may be changed by the operator without the need of a differential. As long as the operator makes the setting in a relatively short period of time, the change of position of the aircraft is very minimal, obviating having to reset the compass dial to account for such change.

FIG. 3 is a face view of the instrument panel of this invention, with a section broken away. Dial 44 is a rotatable compass dial, or card, which is normally driven from the gyro and, of course, displays basic direction information, indicating the heading of the aircraft. The compass may be adjusted manually, as described in detail below. The course selector needle 50, also manually adjustable, is always carried by and rotates with the main instrument assembly which is driven by the gyro, and normally rotates together with compass dial 44. A split Left-Right (L-R) needle 61, having upper and lower portions, indicates position of the aircraft with respect to the desired course as set by course needle 50, the L-R needle being automatically positioned to the left or right of the needle in response to electrical signals communicated from elsewhere in the aircraft. Left-Right needle 61 is integrally connected to the instrument assembly, and mounted within dial 44, and thus always is positioned integrally with course needle 50. A To-From indicator also moves in fixed relationship with the instrument assembly, and indicates whether the aircraft is advancing to or passing from an omni (VORTAC) station. The To-From indicator is comprised of member 62 having windows 63, and inner To-From member 65 which shows through windows 63 and carries To-From information. All of this instrumentation is carried on an axle, or shaft 70 (see FIGS. 7 and 8) which is connected at the front of the instrument to bridge piece 69. The shaft 70 may terminate at the front of the instrument in ball bearing 68 mounted in the center of inner glass window 71 covering the instrument face, as shown. (Alternately, the entire instrument assembly may be cantilevered, without using the front bearing.) A second, outer glass window 72 is preferably also provided. Thus, within one circular display, there is provided a compass dial, a course selector needle, a L-R needle, and a To-From indicator. Each of these separate items is well known in the art, and the details of their operation are widely known.

Referring now to FIGS. 4 and 5, it is seen that the apparatus of this invention is contained within housing 35, with the gyro 40 positioned to the rear of the housing, and the instrument panel being contained within instrument panel housing 58 at the front end of the housing. The gyro is electrically driven from a remote source not shown, suitably by 110 volts, 400 Hertz, and at about 21,000 RPM. It is noted that the gyro of this invention is illustrated as being unslaved, but could also be slaved.

The gyro is mounted in rotatable frame 90 by conventional means. Gyro drive gear 42 is connected to frame 90 through clutch 41, suitably a wavy spring washer, such that it normally moves with the gyro. Gear 42 engages gyro connecting gear 37, which in turn engages instrument drive gear 43, the central axis of which is aligned longitudinally with respect to housing 35, or in a front-to-rear alignment. Drive gear 43 drives shaft 70 on which is mounted instrument assembly carrier 73, which assembly carries L-R meter 74 and To-From meter 75. Electrical signals directed to each of these meters are coupled to the instrument assembly through slip rings 77 from wiring box 78, the electrical signals being connected through to box 78 by wiring 79 which connects to other electrical apparatus carried aboard the aircraft. L-R meter 74 carries split L-R needle 61, and To-From meter 75 carries To-From indicator member 65, each of which terminates in the transverse portions which are seen in FIG. 3. The instrument assembly carrier also normally carries the compass card, or dial 44 (FIG. 7), as well as the OBS (course selector) potentiometer, identified in more detail hereinbelow.

Instrument assembly carrier 73 is symmetrically mounted on centrally aligned instrument shaft 70. Shaft 70 is supported at its rearward end by a suitable bearing mounted on transverse housing member 36, and at its forward end it is supported by ball bearings 68 implanted in inner glass member 71. All of the components and parts carried on shaft 70, and which in turn are driven by gyro 40, are centered about the axis of shaft 70. It is, of course, very important to reduce inertial loads as much as possible, and to reduce frictional drag, in order that the instrument assembly be direct driven from the gyro without the need for an intervening motor drive. By centering all the masses which rotate about the shaft, inertial loads are thus reduced to a minimum.

The instrument assembly carrier 73 is annular at its forward end, as seen particularly in FIGS. 7 and 8. The annular portion is bridged across the front by bridge piece 69 which extends from opposite sides and passes through the center axis of carrier 73. The bridge 69, as seen in FIGS. 3 and 7, is integrally connected to instrument carrier 73, as by the screws shown at 76, such that it is in fact the front-most portion of the carrier. The bridge is formed with a curve which is convex outward, having at the center thereof a forward portion of shaft 70, which is carried in ball bearings 68. As shown in FIG. 8, the Left-Right needle 61 is split into upper and lower sections, above and below bridge 69 respectively. By this means, the bridge is able to provide forward support for the instrument assembly, but does not interfere with movement of the needle which is free to move full scale to the left or to the right. To-From member 62 also is contoured with a convex surface facing to the front of the instrument, and is integrally connected to instrument carrier 73. Immediately behind it, to the rear, is To-From indicator member 65, which is connected to and driven by To-From meter 75.

As seen in FIG. 5, two retracting type knobs are provided for manual control of the instrument. Compass knob 46, sometimes referred to as the azimuth knob, connects through compass knob shaft 64 to compass gear 49. When knob 46 is pushed in by the operator, gear 49 engages instrument drive gear 43. When drive gear 43 is so engaged, rotation of knob 46 causes rotation of the entire instrument assembly, and along with it compass dial 44 and the other indicators illustrated in FIG. 3. Actuation of knob 46 also causes the caging mechanism to lock the gyro in position, as described in detail hereinbelow in connection with the discussion of FIG. 6. Thus, with compass knob 46, the operator can adjust the compass while the gyro is held in position, allowing correction of the compass for gyro drift.

Course selector knob 47 is connected to course selector shaft 55, which carries connecting gear 53. When knob 47 is pressed in, gear 53 engages course selector gear 48, which in turn drives instrument drive gear 43, causing rotation of instrument assembly carrier 73. Also, as with the compass knob, the gyro is caged, so that it is held in a fixed position during operation of the course selector knob. In addition, cam 56, carried on shaft 55, is caused to engage flexible cam follower 82, which has mounted thereon friction brake pad 83. The engagement of cam 56 causes pad 83 to rise into frictional contact with compass card mount 95, which carries compass dial 44, thereby holding the compass card in fixed position. As seen more particularly in FIG. 7, annular compass card mount 95 is carried radially outside of but is not directly attached to the circumference of instrument assembly carrier 73. There exists a slippage space, as indicated at 87, between mount 95 and carrier 73. Carrier 73 is thus free to slideably rotate within mount 95, which is what happens when brake pad 83 is pressed against the mount in a fixed position. Thus, when course selector knob 47 is turned, compass dial 44 is held fixed, while the course selector needle is rotated relative thereto. Since the L-R needle and To-From meter are also fixed to the carrier 73, they also are rotated relative to the compass.

It is to be noted that, alternately, the gyro may be connected to direct drive compass mount 95, with the instrument assembly slip clutched to the compass. In such case, the course selector knob is connected to operate the instrument assembly directly while braking the compass mount.

Attached to inner edge 99 of annular mount 95 are a pair of flexible springs 94, each having a first free end in constant contact with course selector potentiometer ring 93, and a second free end in engagement with one of the two slip rings 97. Potentiometer ring 93 and rings 97 are both mounted on annular printed circuit board 96, which is connected to and carried by the carrier 73. The springs 94 exert frictional force on the two rings, which frictional force normally tends to carry annular mount 95 with the instrument assembly as it rotates. The slip rings 94, thus positioned between mount 95 and printed circuit 96, constitute a slip clutch. Upon application of the braking force through pad 83, mount 95, and the compass dial carried therewith, is held stationary, and does not move with movements of carrier 73. Thus, when the operator rotates knob 47, carrier 73, along with course selector needle 50 which is integrally attached thereto (see FIG. 8), rotates independently of the compass, permitting course selection setting with respect to the compass card.

Referring to FIGS. 4, 5 and 6, the novel means of caging the gyro as used in the system of this invention can be understood. When either knob 46 or 47 is pressed inward, the respective shaft 64 or 55 connected thereto carries forward cage pivot arm 101. As seen in FIG. 6, pivot arm 101 is connected to each of the knob shafts, and is connected at its center to cage linkage bar 100 which runs longitudinally from the front to the rear of the apparatus. When either one of the knobs is moved rearward, cage pivot arm 101 is caused to pivot around a fulcrum provided by the connection of such pivot arm to the other corresponding knob shaft. Thus, if knob 46 is pushed inward, arm 101 pivots clockwise (as seen in FIG. 6) around the point where it is connected to shaft 55. When knob 47 is moved inward, arm 101 pivots counterclockwise (as viewed in FIG. 6) around the pivot point provided by the connection at shaft 64. In either of these cases, or in the event that both knobs are pressed forward simultaneously, cage linkage bar 100 is caused to move rearwardly. The rearward end of bar 100 contains an inclined surface 104, which registers with a roller 103 mounted upon transverse roller support 105, which support has side arms 102 on each side thereof. The rearward end of each side arm 102 is connected to plate 106 through side flanges 107. Thus, when cage linkage bar 100 is moved rearward, roller 103 is forced up the inclined plane 104, causing upward rotation of arm 102 and plate 106. Mounted concentrically above plate 106 is gyro support plate 108 which is integrally connected to gyro frame 90. Hinged caging member 110 is pivotably connected to frame 90, and has at approximately the midsection thereof a boss 111 which extends downwardly through an opening in support plate 108. The free end of member 110 is in contact with a plastic member 112, normally held in a downward position by spring 114. When plate 106 is pivoted upward, it contacts boss 111, pivoting hinge member 110 upward, which in turn raises plastic member 112. Member 112 comes in contact with and engages eccentric cam 113 which is integrally connected to gyro 40. This engagement erects and then cages the gyro in a fixed position, preventing movement of same as long as either knob is being operated. Thus, each knob acts independently of or in concert with the other in providing for caging of the gyro.

From the above description and accompanying drawings, it is seen that the invention as disclosed herein achieves the objective of a direct gyro-driven instrument assembly, having means for adjusting either the compass or the course selector indicator without the requirement of a differential. This is accomplished by the combination of the unique means of caging the gyro from either knob, and the manner in which the compass is clutch-carried by the instrument assembly. Due to the unique manner of mounting the instrument assembly, and particularly in supporting it on the inner glass covering the instrument face and by balancing the mass of the instrument assembly and everything carried by it about the center axis of the assembly, the non-slaved gyro is able to drive the entire instrument load without the need for an intermediate motor.

We claim:

1. Aircraft indicator apparatus for providing bearing and heading information integrated in one panel display, comprising:
   a. a single housing for containing said apparatus;
   b. a gyro, positioned in said housing, for providing a bearing information:
   c. a rotatable instrument assembly, positioned within said housing and forward of said gyro;
   d. direct drive means, for direct driving of said instrument assembly from said gyro;
   e. instrument face means for displaying said bearing information and heading information, operatively connected to and positioned forward of said instrument assembly;
   f. mounting means for mounting said instrument assembly, and having a forward support positioned forward of said instrument face means;
   g. a compass carrier carrying an annular compass dial, and which is clutch coupled to said instrument assembly;
   h. compass setting means, for adjusting said compass dial independently of said gyro when said gyro is caged;
   i. heading selector means, operatively connected to said instrument assembly, for adjusting independently of said compass dial and said gyro when said gyro is caged the desired heading indicated on said instrument face by a heading selector pointer, said heading selector pointer being adapted to normally move together with said compass dial in response to said gyro;
   j. gyro caging means utilizing an eccentric cam integrally connected to said gyro and a hinged caging member pivotably connected to a rotable frame in which said gyro is mounted for erecting and caging said gyro; and
   k. coupling means interconnecting said compass setting means and heading selector means so that either is operative to engage said gyro caging means.

2. The apparatus as described in claim 1, comprising a glass element positioned forward of and adjacent to said instrument face means, and wherein said instrument assembly is supported on a carrier shaft which is annular at its forward end, said annular forward end carrying said instrument face means and containing a bridge element connecting opposite sides of said annular end, said bridge element having integrally connected therewith an axial shaft portion at the center thereof which is rotatably supported in said glass element.

3. The apparatus as described in claim 2, wherein said instrument face means comprises a heading selector needle, a To-From indicator, and a Left-Right indicator.

4. The apparatus as described in claim 3, wherein said Left-Right indicator comprises a split needle, having a first section positioned to a first side of said bridge, and a second portion positioned to the opposite side of said bridge.

5. The apparatus as described in claim 1 having slip clutch means normally connecting said compass dial to said instrument assembly.

6. The apparatus as described in claim 5 wherein said heading selector means is operatively engageable with said slip clutch to hold said compass dial in fixed position when said instrument assembly is moved relative thereto.

7. The apparatus as described in claim 6, comprising gyro cage coupling means, said coupling means interconnecting said compass setting means and said heading selector means so that either is operative to engage said gyro caging means.

8. The apparatus as described in claim 7, wherein said coupling means comprises a pivotable element having a first pivot connection on said compass setting means and a second pivot connection on said heading selector means, such that said compass setting means is pivotable upon said heading selector means and said heading selector means is pivotable on said compass setting means.

9. The apparatus as described in claim 8 wherein said clutch comprises at least one spring element mounted between said compass face carrier and said instrument assembly.

10. Aircraft indicator apparatus for providing bearing and heading information, comprising:
   a. a gyro-driven instrument assembly, carrying instruments which indicate said bearing information and heading information;
   b. a compass carrier carrying an annular compass dial, and which is clutch coupled to said instrument assembly;
   c. compass setting means, for adjusting said compass dial independently of said gyro when said gyro is caged;
   d. heading selector means, operatively connected to said instrument assembly, for adjusting independently of said compass dial and said gyro when said gyro is caged the desired heading indicated on said instrument face by a heading selector pointer, said heading selector pointer being adapted to normally move together with said compass dial in response to said gyro;
   e. gyro caging means utilizing an eccentric cam integrally connected to said gyro and a hinged caging member pivotably connected to a rotatable frame in which said gyro is mounted; and
   f. coupling means interconnecting said compass setting means and heading selector means so that either is operative to engage said gyro caging means.

11. The apparatus as described in claim 10 wherein said heading selector means is operatively engagable with slip clutch means normally connecting said compass dial to said instrument assembly to hold said compass dial in fixed position when said instrument assembly is moved relative thereto.

12. Aircraft indicator apparatus for providing bearing and heading information integrated in one panel display, comprising:
   a. a single housing for containing said apparatus;
   b. a gyro, positioned in said housing, for providing bearing information;
   c. a compass carrier carrying an annular compass dial;
   d. direct drive means, for direct driving of said compass carrier from said gyro;
   e. a rotatable instrument assembly, positioned within said housing and forward of said gyro, and which is clutch coupled to said compass carrier;
   f. instrument face means for displaying said bearing information and heading information, operatively connected to and positioned forward of said instrument assembly instrument assembly;
   g. mounting means for mounting said instrument assembly, and having a forward support positioned forward of said instrument face means;
   h. compass setting means for adjusting said compass dial independently of said gyro when said gyro is caged;
   i. heading selector means, operatively connected to said instrument assembly, for adjusting independently of said compass dial and said gyro when said gyro is caged the desired heading indicated on said instrument face by a heading selector pointer, said heading selector pointer being adapted to normally move together with said compass dial in response to said gyro;
   j. gyro caging means utilizing an eccentric cam integrally connected to said gyro and a hinged caging member pivotably connected to a rotatable frame in which said gyro is mounted for erecting and caging said gyro; and
   k. coupling means interconnecting said compass setting means and heading selector means so that either is operative to engage said gyro caging means.

* * * * *

UNITED STATES PATENT OFFICE
CERTIFICATE OF CORRECTION

Patent No. 3,806,865          Dated April 23, 1974

Inventor(s) Ingo L. Stephan and Robert H. Brady

It is certified that error appears in the above-identified patent and that said Letters Patent are hereby corrected as shown below:

On the Title Page, No. 56, References Cited, add the following United States Patents:

| | | | |
|---|---|---|---|
| --2,406,341 | 8/46 | L. F. Beach et al. | 33/318 |
| 2,704,457 | 3/55 | S. Gabrielson et al. | 33/318 |
| 2,574,471 | 11/51 | C. F. Fragola | 33/317 |
| 2,572,827 | 10/51 | J. S. Adkins et al. | 33/318 |
| 2,334,116 | 11/43 | F. W. Meredith | 33/318 |

Column 2, line 17, after "instrument", insert -- assembly --, and delete the second occurrence of the words -- for use --.

Column 2, line 19, after "omni", change -- of -- to -- or --.

Column 2, line 20, "headings election" should be -- heading selection --.

Column 2, line 45, change -- on -- to -- or --.

Column 10, line 33, delete second occurrence of -- instrument assembly --.

Column 10, line 53, before "said gyro", delete -- and --.

Signed and sealed this 5th day of November 1974.

(SEAL)
Attest:

McCOY M. GIBSON, JR.
Attesting Officer

C. MARSHALL DANN
Commissioner of Patents